United States Patent
Narusawa et al.

(10) Patent No.: US 7,706,014 B2
(45) Date of Patent: Apr. 27, 2010

(54) PRINTING APPARATUS AND STORAGE MEDIUM FOR PRINTING APPARATUS

(75) Inventors: Atsushi Narusawa, Nagano-ken (JP); Satoru Orii, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1576 days.

(21) Appl. No.: 10/977,472

(22) Filed: Nov. 1, 2004

(65) Prior Publication Data
US 2005/0200896 A1    Sep. 15, 2005

(30) Foreign Application Priority Data
Oct. 30, 2003    (JP) .............................. 2003-370081

(51) Int. Cl.
G06K 15/00    (2006.01)
G06K 9/36    (2006.01)
G06K 9/32    (2006.01)

(52) U.S. Cl. ...................... 358/1.18; 358/1.12; 382/291; 382/293; 382/296; 382/297; 715/234; 715/243; 715/244; 715/246; 715/252; 715/253; 715/273; 715/274

(58) Field of Classification Search ................ 382/296, 382/297, 291, 293; 358/1.1–1.18; 715/234, 715/273, 274, 243–253, 790, 793
See application file for complete search history.

(56) References Cited

U.S. PATENT DOCUMENTS

| | | | | |
|---|---|---|---|---|
| 5,850,478 A | * | 12/1998 | Suzuki et al. | 382/204 |
| 5,963,641 A | * | 10/1999 | Crandall et al. | 380/2 |
| 6,011,877 A | * | 1/2000 | Ishikawa et al. | 382/290 |
| 6,417,931 B2 | * | 7/2002 | Mori et al. | 358/1.15 |
| 6,433,896 B1 | * | 8/2002 | Ueda et al. | 358/488 |
| 6,631,077 B2 | * | 10/2003 | Zuo | 361/699 |
| 6,834,126 B1 | * | 12/2004 | Henry et al. | 382/276 |
| 6,922,260 B2 | * | 7/2005 | Nishikawa et al. | 358/1.18 |
| 6,944,355 B2 | * | 9/2005 | Lupien et al. | 382/275 |
| 7,212,309 B1 | * | 5/2007 | Sellers et | 358/1.2 |
| 7,305,619 B2 | * | 12/2007 | Kaneda et al. | 715/273 |
| 2004/0179105 A1 | * | 9/2004 | Endo et al. | 348/211.1 |

FOREIGN PATENT DOCUMENTS

JP    2002-91726 A    3/2002

OTHER PUBLICATIONS

Fujisawa Atsushi, Printer System, Mar. 29, 2002, JP 2002-091726 English Translation.*

* cited by examiner

*Primary Examiner*—Twyler L Haskins
*Assistant Examiner*—Dennis Dicker
(74) *Attorney, Agent, or Firm*—Sughrue Mion, PLLC

(57) ABSTRACT

A printing device enables a laid-out and drawn image to be printed without any subsequent rotation. In the presence of an orientation change command, the printing device receives a layout command and determines a layout of each object in each page on the medium with conversion of coordinates at a preset position of the object. In the presence of the orientation change command, the printing device receives a print command, fetches an object according to the stored layout in each page, and draws and prints the fetched object in response to the orientation change command. No subsequent orientation change of drawing data, which has been laid out and drawn in the specified page orientation, is required to generate converted drawing data corresponding to the specified medium orientation.

5 Claims, 12 Drawing Sheets

Fig. 4

Sampl.html

```
<?xml version=" 1.0" encoding=" Shift_JIS" ?>
<!DOCTYPE html PUBLIC  "-//W3C//DTD XHTML 1.0 Strict//En"
            "http://www. w3. org/TR/xhtml 11/DTD/xthml11-strict.dtd" >
<html>
<head>
    <link rel=" stylesheet" type=" text/css" href=" ./sample.css" />
  </head>
  <body>
    <div><img src=" imagesample_1. jpg" />Image 1</div>
    <div><img src=" imagesample_2. jpg" />Image 2</div>
</body>
</html>
```

Fig. 5

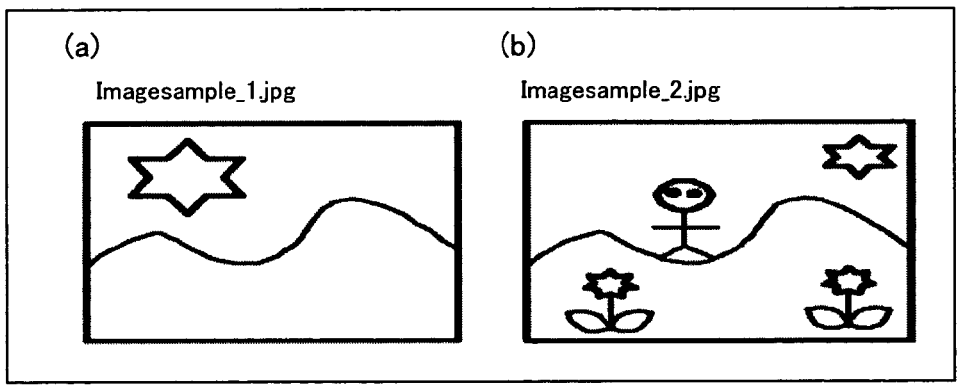

sample.css img{ width:16cm height:8cm : }

@page{size: 29.7cm 21.0cm}

PRINTING APPARATUS AND STORAGE MEDIUM FOR PRINTING APPARATUS

BACKGROUND OF THE INVENTION

1. Field of the Invention

The present invention relates to a printing device, a printing method, and a storage medium for a printing device.

2. Description of the Prior Art

One proposed printer system includes a printer that analyzes and prints SVG documents and a formatting server that converts HTML documents into SVG documents as disclosed in Japanese Patent Laid-Open Gazette No. 2002-91726 (see FIG. 1 and page 5). In this printing system, the formatting server converts each received HTML document into an SVG document, and the printer analyzes and prints the converted SVG document. The printing system rotates an image having specification of an A4 horizontal page layout by 90 degrees to an orientation-changed image corresponding to an A4 vertical paper layout.

SUMMARY OF THE INVENTION

The prior art printer system includes the printer and the formatting server and is thus rather space-consuming to be unsuitable for a limited space, for example, in a living room of the house. This printer system is designed to rotate drawing data of the A4 horizontal layout to drawing data corresponding to the A4 vertical layout. An additional memory is accordingly required for such orientation change of the drawing data.

By taking into account the drawbacks of the prior art technique discussed above, a printing device, a corresponding printing method, and a program for the printing device of the invention aim to print a laid-out and drawn image without subsequent rotation even under requirement of rotation of drawing data due to a difference between a specified paper orientation and a page orientation specified in a document, which describes objects in a hierarchical manner in a preset format, such as an HTML document or an extensible XHTML document.

A printing device, a printing method, and a storage medium for a printing device of the present invention are constructed as follows.

The present invention is directed to a printing device that analyzes a document of describing printable objects in a hierarchical manner in a preset format, prints the objects on a medium, such as paper, and includes: a data storage module that stores data; and a structural analysis module that analyzes a hierarchical tree structure of each object described in a given document and stores the analyzed tree structure into the data storage module. The printing device of the invention includes a layout setting module that receives a layout command and, in the absence of an orientation change command, determines a layout of each object in each page, which has a page orientation specified by description of the given document, on the medium based on the tree structure stored in the data storage module and stores the determined layout in each page into the data storage module, while in the presence of the orientation change command, determining a layout of each object in each page, which has a page orientation specified by the description of the given document, on the medium based on the tree structure stored in the data storage module, converting coordinates at a preset position of each object in response to the orientation change command, and storing the determined layout in each page into the data storage module. The printing device of the invention further includes a print execution module that receives a print command and, in the absence of the orientation change command, fetches an object according to the layout in each page stored in the data storage module and draws and prints the fetched object on the medium, while in the presence of the orientation change command, fetching an object according to the layout in each page stored in the data storage module and drawing and printing the fetched object on the medium in response to the orientation change command.

In the presence of an orientation change command given to eliminate a difference between a page orientation and a medium orientation, the printing device of the invention receives a layout command and determines a layout of each object in each page on the medium with conversion of coordinates at a preset position of the object in response to the orientation change command. In the presence of the orientation change command, the printing device of the invention receives a print command, fetches an object according to the stored layout in each page, and draws and prints the fetched object in response to the orientation change command. Even when the page orientation is different from the medium orientation, this arrangement does not require any subsequent orientation change of drawing data, which has been laid out and drawn in the specified page orientation, to generate converted drawing data corresponding to the specified medium orientation. This arrangement thus desirably saves the memory capacity for storage of the drawing data.

The terminology 'page orientation' means the orientation of page in the layout of the object. For example, the horizontal layout of a page is 'landscape' (may simply be referred to as 'horizontal'), and the vertical layout of a page is 'portrait' (may simply be referred to as 'vertical'). The terminology 'medium orientation' means the feeding direction of a medium, such as printing paper. For example, feed of the medium in the horizontal direction to the printing device is 'landscape' (may simply be referred to as 'horizontal'), and the feed of the medium in the vertical direction to the printing device is 'portrait' (may simply be referred to as 'vertical'). The document may be described in a markup language, such as XHTML language. The printable objects include texts, images, and tables. The printing device may be constructed as any of diverse printers, for example, a color inkjet printer.

The printing device of the invention may further includes: a medium orientation setting module that sets an orientation of the medium; and an orientation change command output module that specifies the page orientation based on the description of the given document and outputs the orientation change command when the specified page orientation is different from the orientation of the medium set by the medium orientation setting module.

In the printing device of the invention, the orientation change command may be output when the specified page orientation is different from an orientation of the medium by 90 degrees. In this case, the orientation change command may be output when the specified page orientation is landscape and the orientation of the medium is portrait.

in the printing device of the invention, the coordinate conversion executed by the layout setting module may convert coordinates $(X^1n, Y^1n)$ at the preset position of each object laid out by the layout setting module into coordinates $(X^2n, Y^2n)$ according to Equations (1) and (2) given as follows, where n represents the number of objects included in a page box and is an integral value of not less than 1:

$$X^2n = \text{Width of Medium in Specified Orientation} - Y^1n \quad (1); \text{ and}$$

$$Y^2n = X^1n \quad (2).$$

In the printing device of the invention, the preset position of each object may be an upper left corner of the object. The conversion according to Equations (1) and (2) ensures easy coordinate conversion at the upper left corner of the object ensures easy coordinate conversion and subsequent drawing.

The technique of the invention described above is applicable to a printing method that executes respective functions of the modules in the printing device and a computer program that causes one or multiple computers to execute respective functions, as well as a storage medium that stores the program. The program may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form.

BRIEF DESCRIPTION OF THE DRAWINGS

FIG. 4 shows an example of XHTML document;

FIG. 5 shows examples of images adopted in the XHTML document;

DESCRIPTION OF THE PREFERRED EMBODIMENTS

One mode of carrying out the invention is described below as a preferred embodiment.

Figure 1:
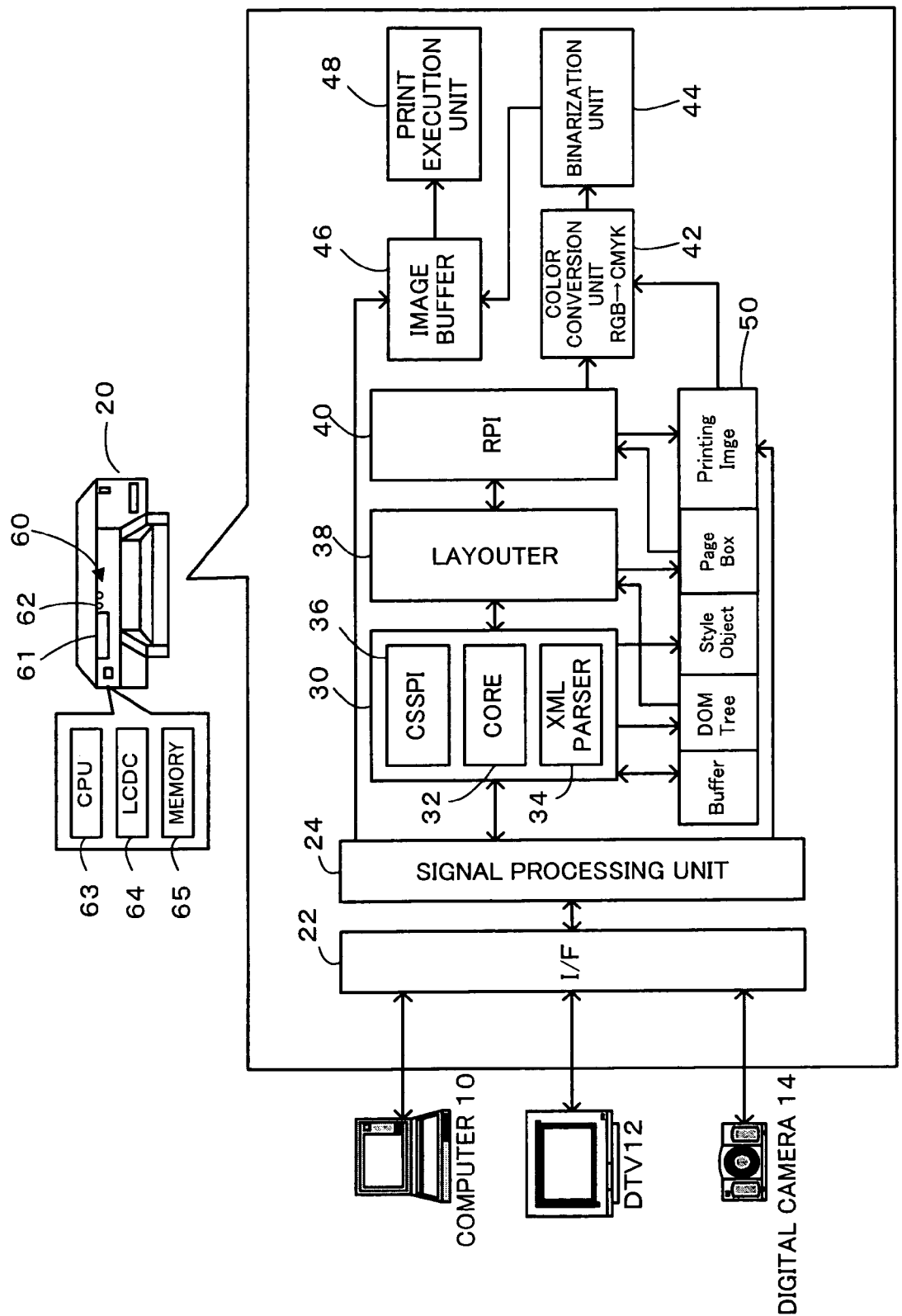
FIG. 1 schematically illustrates the structure of a color inkjet printer 20 in one embodiment of the invention.

FIG. 1 schematically illustrates the structure of a color inkjet printer 20 in one embodiment of the invention. The color inkjet printer 20 of this embodiment includes an input interface 22 that is connected with a computer 10, a digital TV receiver 12, and a digital camera 14 to input digital images (hereafter simply referred to as images), a signal processing unit 24 that determines a data output destination according to the format of each input image into the input interface 22, and an analyzer unit 30 that analyzes an XHTML document described in a markup language XHTML (extensible Hyper Text Markup Language) to create a DOM (Document Object Model) tree as an object tree structure, reads a CSS (Cascading Style Sheets) document described in CSS to create a style object, and writes the DOM tree and the style object into a memory 50. The color inkjet printer 20 also includes a layouter 38 that lays out images and texts as elements (objects) described in the XHTML document on each printing page based on the DOM tree and the style object created by the analyzer unit 30 and writes each laid out printing page as a page box into the memory 50, a rendering plug-in (hereafter referred to as RPI) 40 that draws a printing image in the form of RGB (red, green blue) data based on the page box laid out by the layouter 38, a color conversion unit 42 that converts a printing image of the drawn RGB data into CMYK (cyan, magenta, yellow, black) data, a binarization unit 44 that makes the converted CMYK data subjected to error diffusion or another required series of image processing to binarize the CMYK data, and an image buffer 46 that temporarily accumulates data in order to output the binarized CMYK data in units of bands to a print execution unit 48 with a non-illustrated print head.

The signal processing unit 24 outputs input print data in an immediately printable form to the image buffer 46 of the print execution unit 48, input RGB data to a printing image storage area of the memory 50, and an input file of an XHTML document to the analyzer unit 30.

The analyzer unit 30 includes a core 32 that gives an analysis command for analysis of an XHTML document to create a DOM tree, an XML parser 34 that analyzes the XHTML document in response to the analysis command given by the core 32, and a CSS plug-in (hereafter referred to as CSSPI) 36 that analyzes a CSS document in response to a request given by an initialization process in a link tag of the created DOM tree.

An operation unit 60 includes a liquid crystal display 61 located on the front side of the color inkjet printer 20, two operation buttons 62 provided by the side of the liquid crystal display 61, and a one-chip microcomputer including a CPU 63, a display controller (LCDC) 64, and a ROM 65. The user manipulates the operation unit 60 to set, for example, the size and the orientation of printing paper and the type of inks set in the printer 20. In response to the user's push of the operation button 62, a processing program stored in advance in the ROM 65 is activated to display a menu for settings on the liquid crystal display 61. For example, the user selects a desired paper type 'Plain Paper' and desired paper size and orientation 'A4 Portrait' among available options in the displayed menu. Such user's settings through the operations of the operation unit 60 are not characteristic of the present invention and are thus not described in detail.

Figure 2:
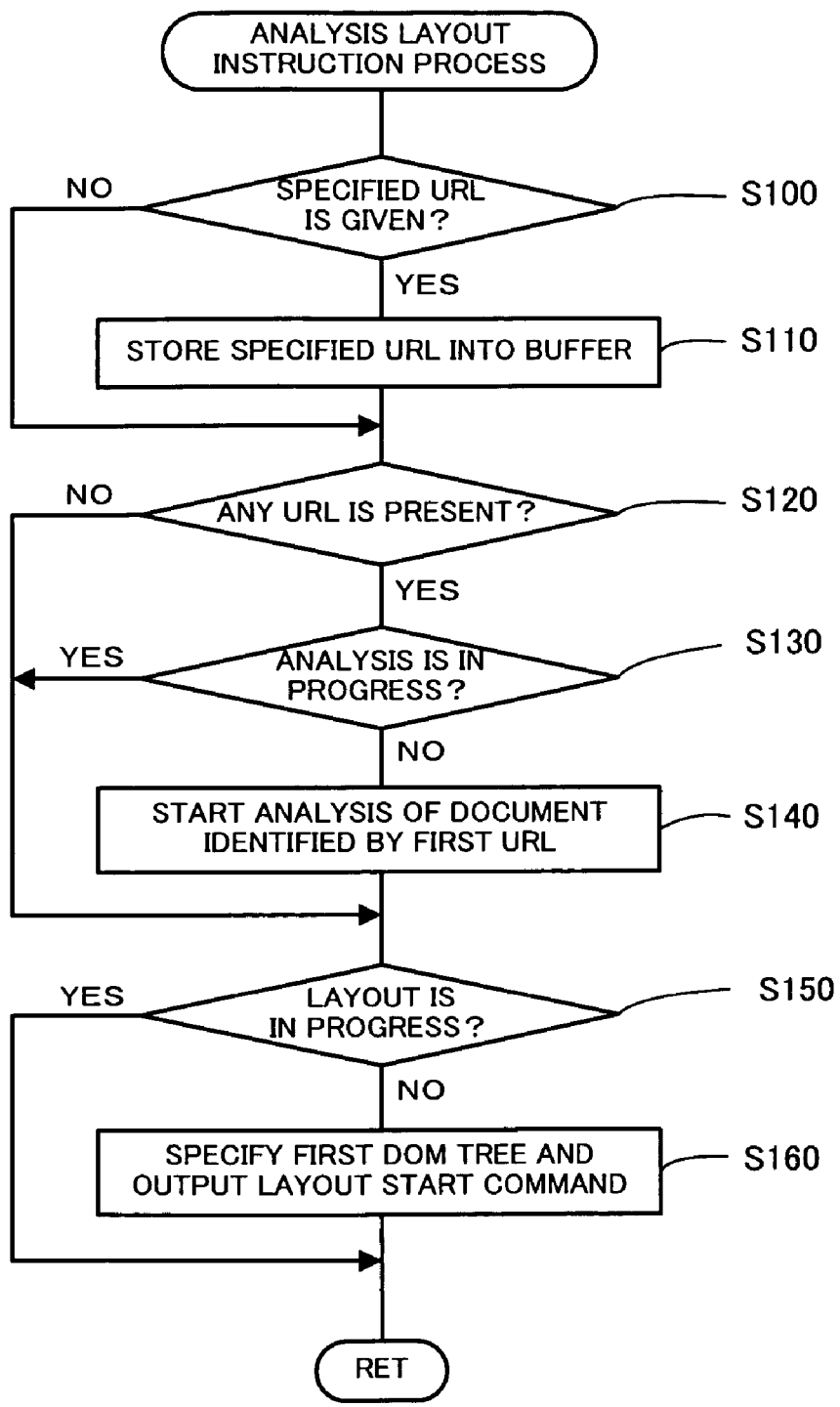
FIG. 2 is a flowchart showing an analysis layout instruction process.

The following describes operations of the color inkjet printer 20 of the embodiment constructed as discussed above, especially a series of operations to print an XHTML document. FIG. 2 is a flowchart showing an analysis layout instruction process executed by the analyzer unit 30. This process is executed repeatedly at preset time intervals (for example, at every 8 msec). In the analysis layout instruction process, the analyzer unit 30 first determines whether a specified URL (Uniform Resource Locator) is given to identify an XHTML document (step S100). When a specified URL is given, the URL is stored in a URL storage buffer area set in the memory 50 (step S110). When no specified URL is given, on the other hand, the processing flow proceeds to a next step. The specified URL may be output, for example, from the digital TV receiver 12 to the color inkjet printer 20 when the user selects a desired option to be printed by the color inkjet printer 20 among printable options displayed on the digital TV receiver 12. The specified URL may be selected simply by the computer 10 and given with a print command to the color inkjet printer 20. The computer 10 typically has functions of executing analysis of the XHTML document, layout, color conversion, and binarization. The computer 10 may, however, not execute any of such processing but may send only the specified URL to the color inkjet printer 20.

The analyzer unit 30 subsequently determines whether any URL is present in the URL storage buffer area of the memory 50 (step S120) and whether any XHTML document is currently being analyzed (step S130). The analyzing status of an XHTML document is detected, for example, by determining whether the analyzer unit 30 is currently analyzing any XHTML document, simultaneously with and in parallel with this analysis layout instruction process. One concrete procedure may set and reset a flag at the start and the end of analysis.

Figure 3:
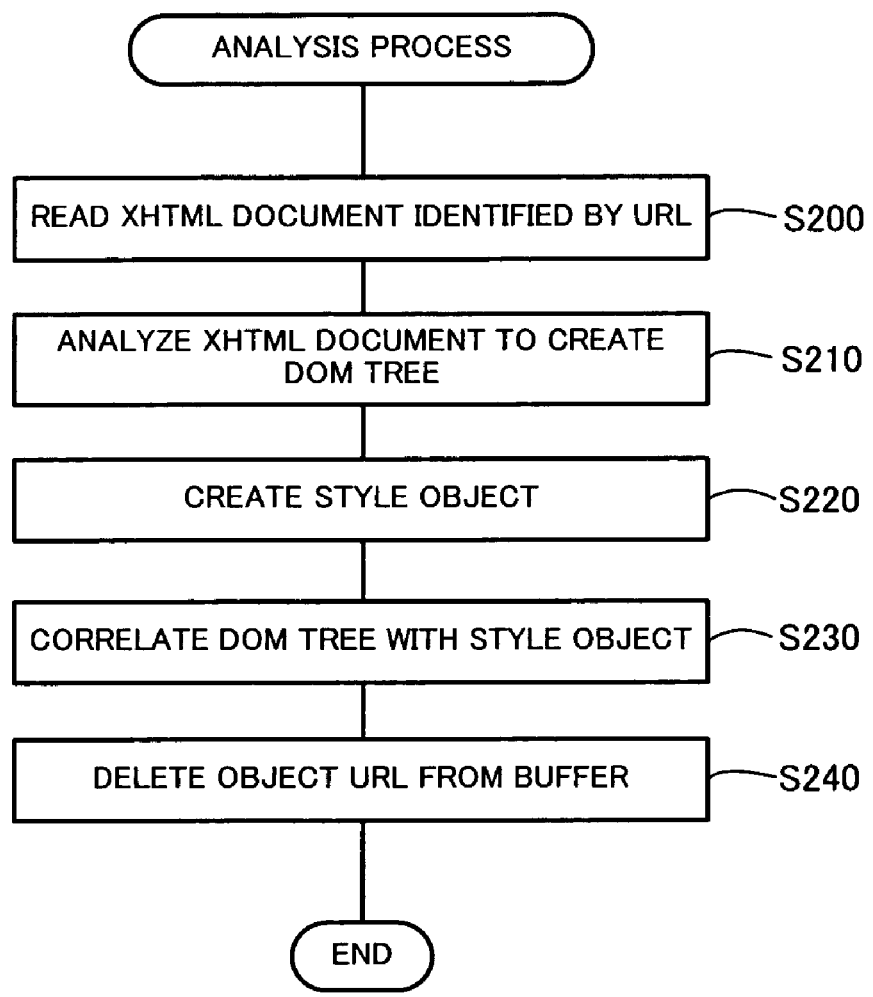
FIG. 3 is a flowchart showing an analysis process.

When any URL is present in the URL storage buffer area and no XHTML document is currently being analyzed, the analyzer unit 30 reads out a first URL stored in the URL storage buffer area of the memory 50 and starts analysis of an XHTML document identified by the read-out URL (step S140). When no URL is present in the URL storage buffer area or when any URL is present but an XHTML document is currently being analyzed, on the other hand, the processing flow proceeds to a next step. Analysis of the XHTML document is carried out according to an analysis process shown in FIG. 3. The analysis process analyzes an XHTML document identified by a URL to create a DOM tree, analyzes a CSS document specified by the XHTML document to create a style object, and stores the DOM tree and the style object respectively into a DOM tree storage area and a style object storage area set in the memory 50. A DOM tree ID (the URL with an affix DOM in this embodiment) as identification information is assigned to the DOM tree, whereas a style object ID (the name of the CSS document in this embodiment) as identification information is assigned to the style object. The details of the analysis process will be discussed later.

The analyzer unit 30 then determines whether the layouter 38 is currently making a layout (step S150). When the layouter 38 is not currently making a layout, the analyzer unit 30 specifies a first DOM tree with a given DOM tree ID among DOM trees stored in the DOM tree storage area of the memory 50 and outputs a layout start command to the layouter 38 (step S160), before terminating this analysis layout instruction process. When the layouter 38 is currently making a layout, on the other hand, the analyzer unit 30 terminates the analysis layout instruction process without outputting a layout start command. The layout execution status of the layouter 38 is determined, for example, by detection of input of a layout end signal from the layouter 38. The input of the layout end signal will be described later as part of the processing by the layouter 38.

The analysis layout instruction process is executed in a repeated manner as mentioned above. Every time a specified URL is given, the analyzer unit 30 stores the specified URL into the URL storage buffer area of the memory 50, whether or not an XHTML document is being analyzed. When any URL is present in the URL storage buffer area of the memory 50, the analyzer unit 30 successively analyzes XHTML documents, whether or not the layouter 38 is currently making a layout. This may result in storage of multiple URLs in the URL storage buffer area, storage of multiple DOM trees in the DOM tree storage area, and storage of multiple style objects in the style object storage area of the memory 50. In the structure of this embodiment, the URL storage buffer area, the DOM tree storage area, and the style object storage area are respectively set to have the capacities for storing the multiple URLs, the multiple DOM trees, and the multiple style objects.

Figure 6:
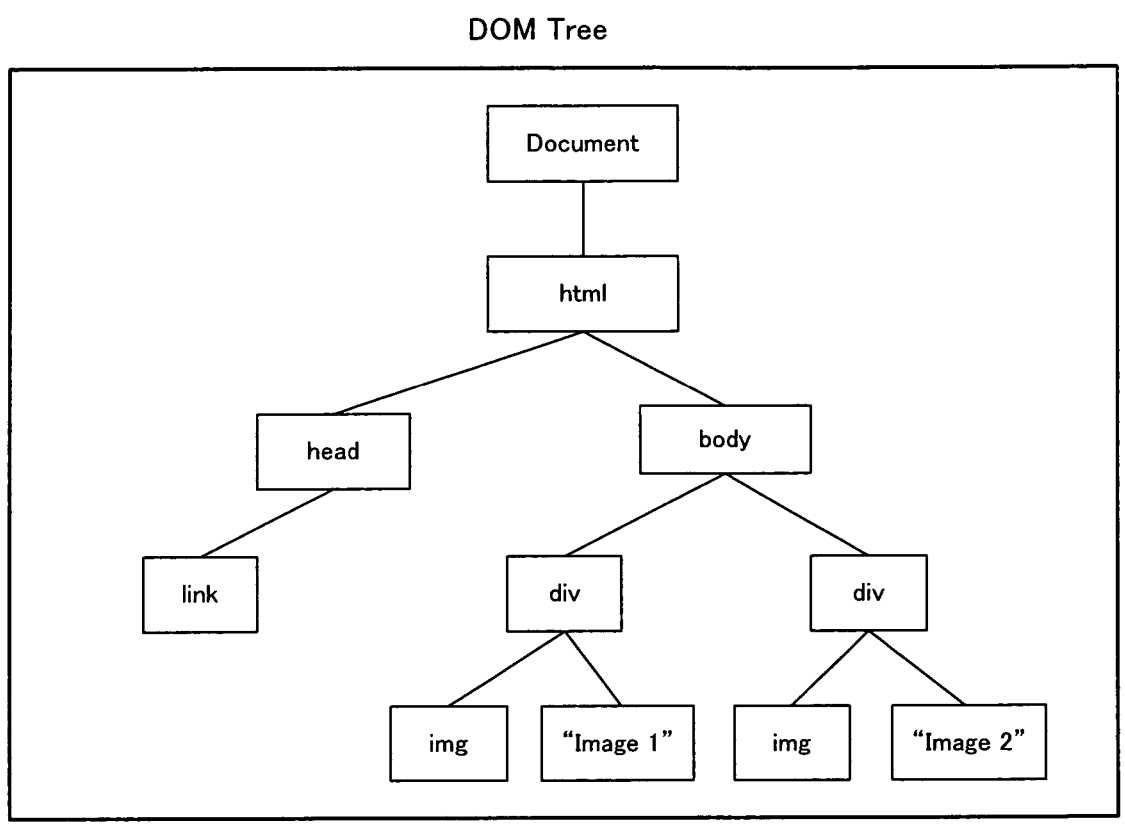
FIG. 6 shows an example of a DOM tree.

The description relates to the analysis process executed by the analyzer unit 30. The analysis process is carried out according to the flowchart of FIG. 3 as mentioned above. As a matter of convenience, the description of the analysis process regards an XHTML document shown in FIG. 4 as one example. FIG. 5 shows images stored in the JPEG format adopted in the XHTML document of this example. When the analysis layout instruction process outputs an analysis start command with a specified URL, the analyzer unit 30 reads an XHTML document identified by the specified URL (step S200) and analyzes the XHTML document to create a DOM tree (step S210). According to the concrete procedure, the core 32 specifies a URL and gives an analysis request to the XML parser 34. The XML parser 34 reads the XHTML document identified by the URL and sequentially analyzes the XHTML document from the top to create respective elements. The core 32 then registers the respective created elements in a DOM tree. The XML parser 34 correlates the created elements and registers the correlated elements in the DOM tree storage area of the memory 50. FIG. 6 shows a DOM tree created by analysis of the XHTML document of FIG. 4.

Figures 7, 8:
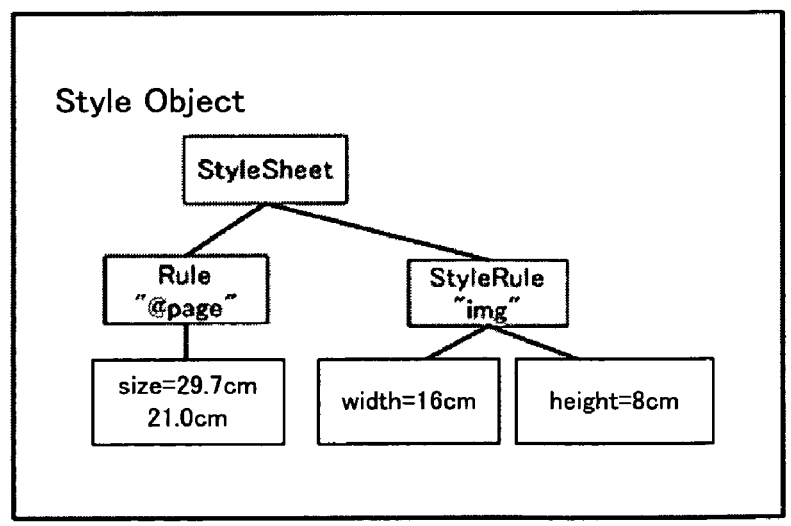
FIG. 7 shows an example of a CSS document.
FIG. 8 shows an example of a style object.

After creation of the DOM tree, the analyzer unit 30 reads a CSS document specified by the XHTML document and analyzes the CSS document to create a style object (step S220). According to the concrete procedure, the CSSPI 36 reads the specified CSS document in response to a request given in an initialization process in a link tag, a style tag, or a style attribute of another tag of the created DOM tree, sequentially analyzes the CSS document from the top to create rules as a style object, and stores the created style object with the name of the CSS document as the style object ID into the memory 50. FIG. 7 shows a CSS document specified by the XHTML document of the example. FIG. 8 shows a style object created by analysis of this CSS document. The CSS document includes specified dimensions of each printing page (width×length). The page dimensions determine the orientation of the page, either portrait (vertical layout) or landscape (horizontal layout). For example, the CSS document shown in FIG. 7 has description about the dimensions of each page, @page{size: 29.7 cm 21.0 cm}, which is also included as an element of the style object in FIG. 8.

After creation of the style object with regard to the CSS document specified by the XHTML document, the analyzer unit 30 correlates the DOM tree with the style object (step S230) and deletes the URL as the object of analysis from the URL storage buffer area (step S240), before terminating the analysis process.

Figure 9:
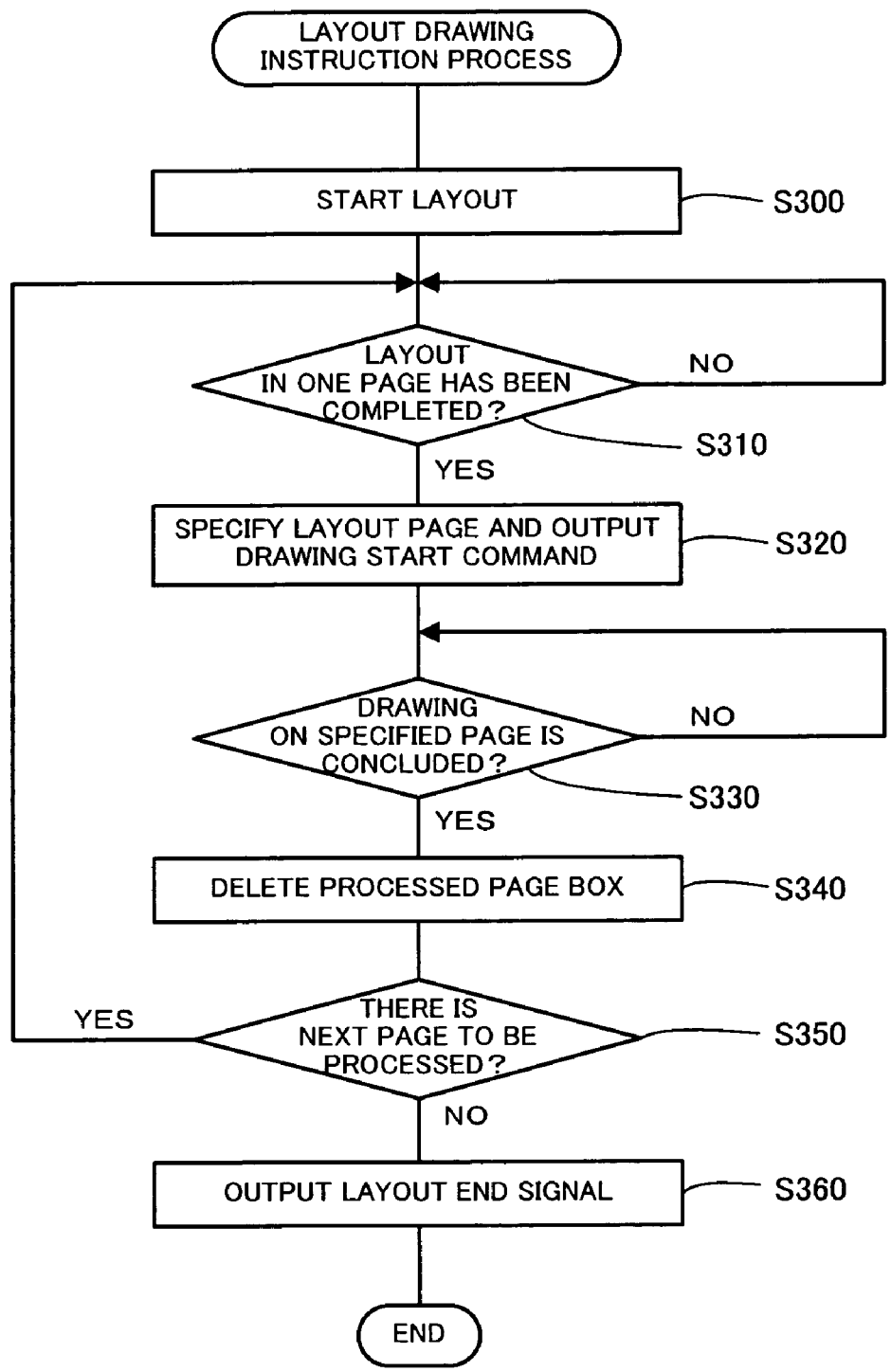
FIG. 9 is a flowchart showing a layout drawing instruction process.
Figure 10:
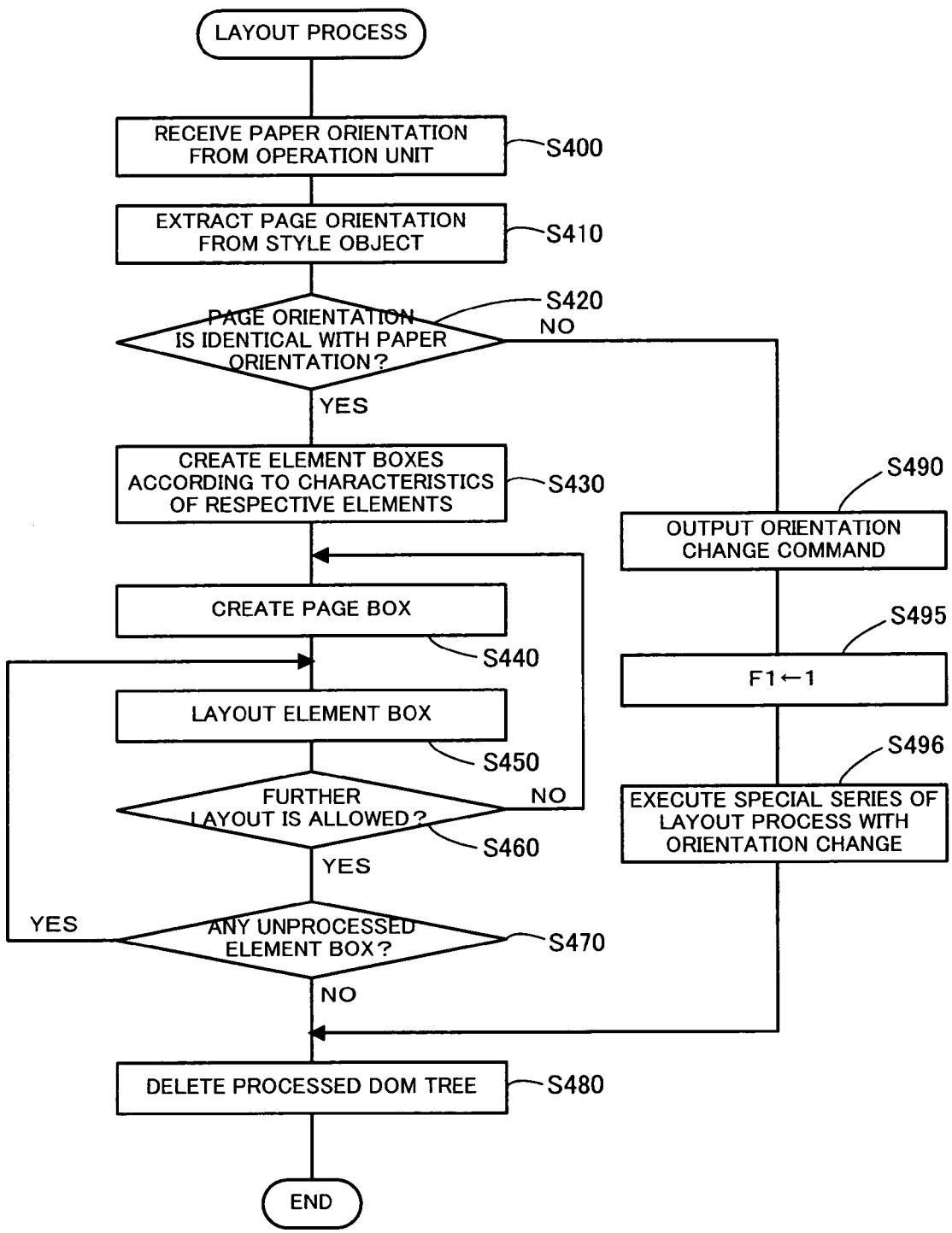
FIG. 10 is a flowchart showing a layout process.

The series of processing executed by the layouter 38 is described below. FIG. 9 is a flowchart showing a layout drawing instruction process executed by the layouter 38 when the analyzer unit 30 specifies a DOM tree and outputs a layout start command. In the layout drawing instruction process, the layouter 38 starts a layout according to the specified DOM tree (step S300). The layout is made according to a layout process shown in the flowchart of FIG. 10. For convenience of explanation, the layout process is described first.

In the layout process, the layouter 38 first receives paper-related information from the operation unit 60 (step S400). The paper-related information includes the type, the size, and the orientation of printing paper. The layouter 38 then extracts the orientation of each page from the style object correlated with the specified DOM tree (step S410) and compares the received paper orientation with the extracted page orientation (step S420). When the received paper orientation is identical with the extracted page orientation, the layouter 38 executes a standard series of layout process. When the received paper orientation is different from the extracted page orientation, on the other hand, the layouter 38 determines a requirement of changing the page orientation corresponding to the paper orientation. The layouter 38 accordingly gives an orientation change command (step S490) to lay out each object at an adequate position and create a page box with a change of the page orientation to eliminate the difference between the page orientation and the paper orientation. The layouter 38 also sets a value '1' to an orientation change flag F1 (step S495) and executes a special series of layout process with orientation change (step S496). In one typical example of the different page orientation from the paper orientation, the specified orientation of each page is landscape while the orientation of paper specified by the operation unit 50 is portrait, or vice versa. As a matter of convenience, the description first regards the standard series of layout process executed under the condition of the paper orientation identical with the page orientation and then regards the special series of layout process executed under the condition of the paper orientation different from the page orientation.

Figure 13:
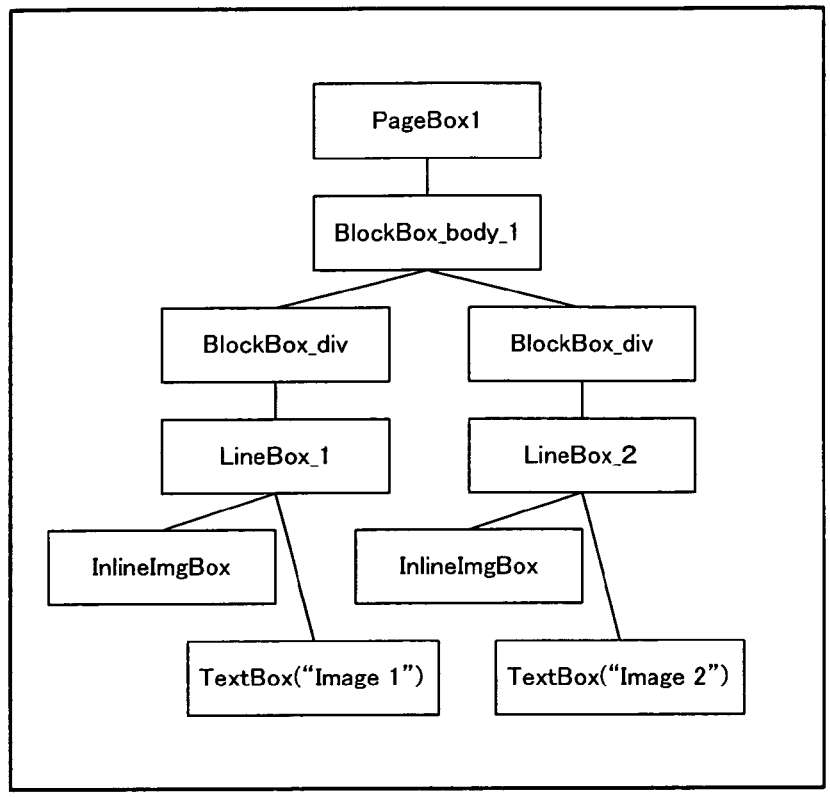
FIG. 13 shows an example of a page box.

In the standard layout process, the layouter 38 first creates element boxes according to the characteristics of the respective elements included in the specified DOM tree (step S430). For example, the layouter 38 creates an image box corresponding to an image element, while creating a text box corresponding to a text element. The layouter 38 subsequently creates a page box corresponding to each page (step S440) and sequentially lays out element boxes in a body tag under the page box until prohibition of further layout (steps S450 to S470). The layout of an image box reads an image size, sets lines corresponding to the image size, and registers the image box on the lines or determines the position (coordinates) of the image box. When the image size suggests an insufficient space for layout of the image box, further layout is prohibited at step S460. The layouter 38 accordingly creates another page box corresponding to a next page (step S440). The layout of text boxes creates a first text box corresponding to a first part of a text receivable in one line, registers the first text box on the line, creates a next text box corresponding to a next part of the text receivable in a next line, and registers the next text box on the next line. Such creation and registration are repeated to register all the text. In the event of failed registration of all the text to a last text box registered on a last line of one page, further layout is prohibited at step S460. The layouter 38 accordingly creates another page box corresponding to a next page and successively creates text boxes corresponding to the remaining text and registers the text boxes on respective lines in the above manner. FIG. 13 shows a page box of one page given as a result of layout according to the DOM tree of the example. The layout of all the element boxes ensures storage of the layout objects including page boxes corresponding to the specified XHTML document in the memory 50. The layouter 38 then deletes the specified DOM tree from the DOM tree storage area of the memory 50 (step S480) and terminates the layout process. The DOM tree as the object of the layout is deleted from the DOM tree storage area of the memory 50 on conclusion of the layout process. This arrangement desirably prevents unnecessary storage of the processed DOM tree in the limited space of the DOM tree storage area and sets a space for storage of another DOM tree created by the analyzer unit 30.

The following describes the special series of layout process executed under the condition of the paper orientation different from the page orientation. In response to output of the orientation change command by the layouter 38, the page box creation step converts (rotates) the coordinates at a preset position of a laid-out object or an element box on the DOM tree corresponding to a required angle of orientation change. The subsequent drawing process rotates the object at the coordinate-converted preset position by the required angle of orientation change and draws the rotated object. The layout and drawing of the object with the orientation change to eliminate the difference between the page orientation and the paper orientation gives drawing data (RGB data) corresponding to the specified paper orientation, even when the paper orientation is different from the page orientation. This layout process with orientation change allows for drawing a page box created in the specified page orientation and without subsequent rotation of the drawing data corresponding to the paper orientation different from the page orientation.

Figure 11:
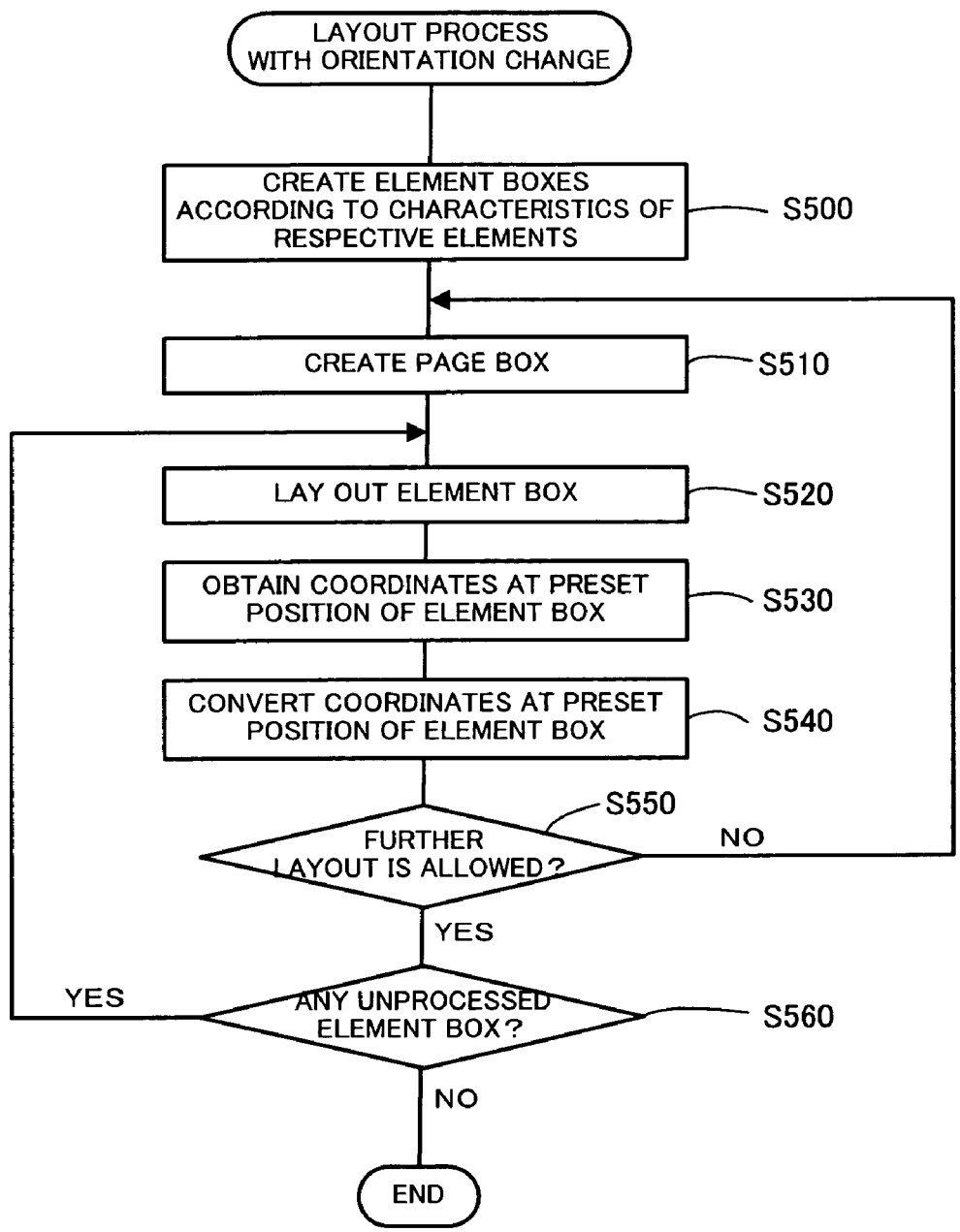
FIG. 11 is a flowchart showing a layout process with orientation change.

The flowchart of FIG. 11 shows the special series of layout process executed in response to the orientation change command. The special series of layout process shown in FIG. 11 creates element boxes according to the characteristics of the respective elements (step S500) and creates a page box (step S510) in the same manner as the standard series of layout process described above. The special layout process subsequently lays out each element box in the specified page orientation (step S520) and obtains coordinates at a preset position of the laid-out element box, for example, coordinates $(X^1,Y^1)$ at an upper left corner of the element box (step S530). The special layout process then obtains new coordinates at the preset position of the element box after page orientation change to eliminate the difference between the page orientation and the paper orientation, for example, coordinates $(X^2, Y^2)$ after the page orientation change (step S540). When the specified page orientation is landscape and the paper orientation is portrait, the page orientation change rotates the page of landscape orientation clockwise by 90 degrees about the origin (0,0) (upper left corner) of the page to have the portrait orientation. When the specified page orientation is portrait and the paper orientation is landscape, on the contrary, the page orientation change rotates the page of portrait orientation counterclockwise by 90 degrees about the origin (upper left corner) of the page to have the landscape orientation.

The coordinates $(X^1,Y^1)$ on the page of landscape orientation may be converted into the coordinates $(X^2,Y^2)$ on the page of portrait orientation, for example, according to Equations (1) and (2) given below:

$$X^2 = \text{Page Width in Specified Paper Orientation (Portrait in this Example)} - Y^1 \quad (1)$$

$$Y^2 = X^1 \quad (2)$$

Figure 12:
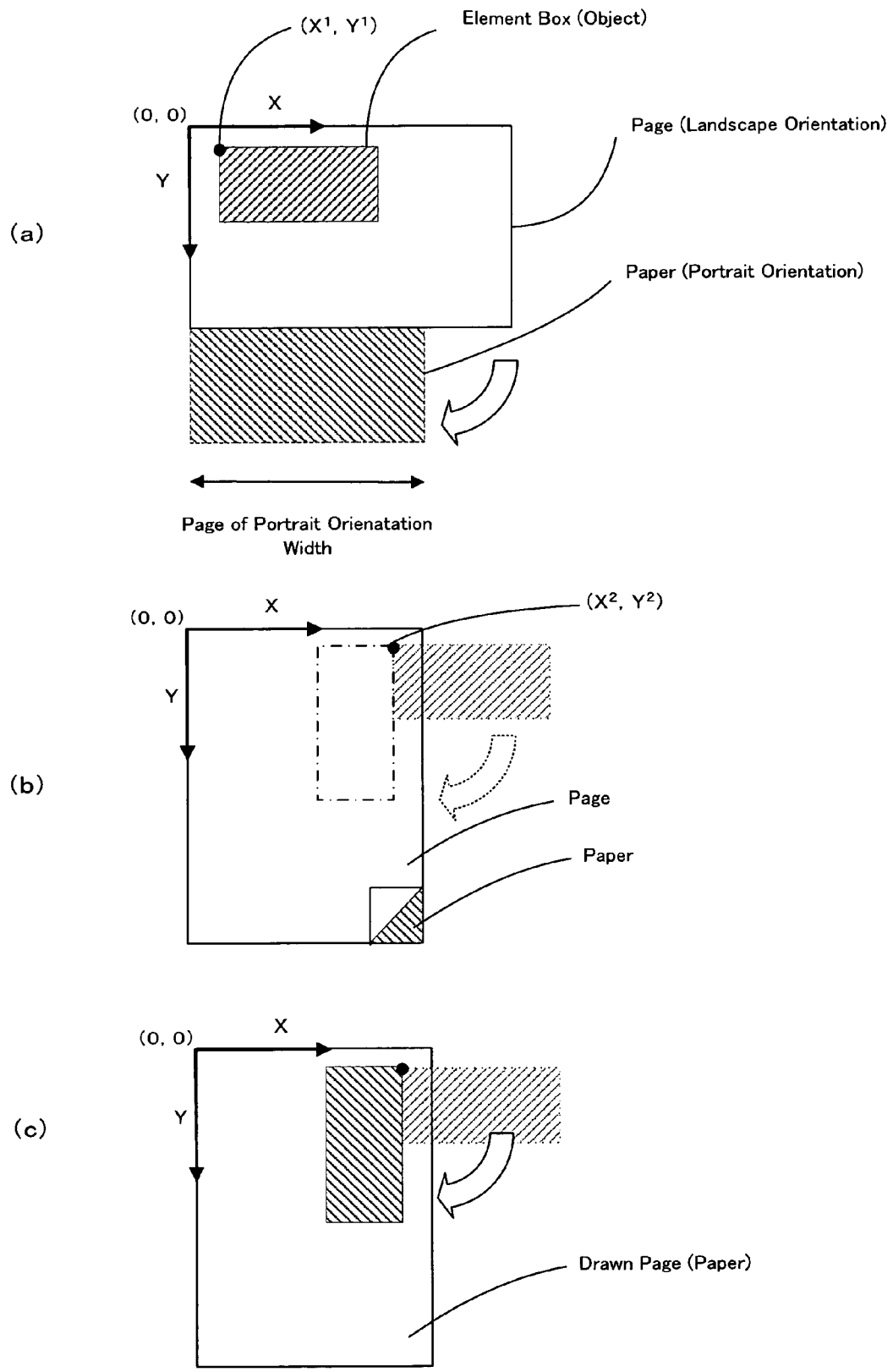
FIGS. 12a, 12b and 12c, are conceptual views showing a result of layout and drawing process executed in response to an orientation change command.

FIG. 12 is a conceptual view showing a result of the layout and drawing process executed in response to the orientation change command. In the illustrated example of FIG. 12, the page orientation change modifies the arrangement of an element box (hatched box) laid out on a page of landscape orientation and converts the coordinates $(X^1,Y^1)$ at a preset position of the element box into new coordinates $(X^2,Y^2)$ according to the above equations. The new coordinates $(X^2, Y^2)$ are equivalent to the original coordinates $(X^1,Y^1)$ on the page of the portrait orientation by rotating the page of the landscape orientation clockwise by 90 degrees as shown in FIG. 12(b). As clearly shown in FIGS. 12(a) and 12(b), this page orientation change converts the coordinates at the preset position of the element box with rotation of the page of landscape orientation to the page of portrait orientation. The concrete procedure rotates the page of landscape orientation including the coordinates $(X^1,Y^1)$ at the preset position clockwise by 90 degrees about the origin (0,0) at the upper left corner of the page to the page of portrait orientation and gives the new coordinates $(X^2,Y^2)$ at the corresponding position on the rotated page in the new X-Y coordinate system. The coordinate conversion of the element box or the object at the preset position specifies a reference position for drawing the object in the portrait orientation. This coordinate conversion step simply converts the coordinates at the preset position of the element box, that is, only one set of coordinates as the reference for layout. The subsequent drawing process rotates the object and draws the rotated object to generate drawing data output in the portrait orientation (see FIG. 12(c)). This is described later in relation to the drawing process.

The above series of layout process is repeated with regard to the respective element boxes (steps S510 to S560). On completion of the processing of all the element boxes, a page box that corresponds to the specified XHTML document and has been laid out with the orientation change is stored in the memory 50.

Referring back to the layout drawing instruction process (FIG. 9), the layouter 38 waits for completion of layout on the first page (step S310) and specifies the layout page and outputs a drawing start command to the RPI 40 (step S320). Completion of layout on one page is detected by determining whether or not a page box corresponding to a next page has been created or whether or not the layout process has been concluded in the case of only one page.

Figure 15:
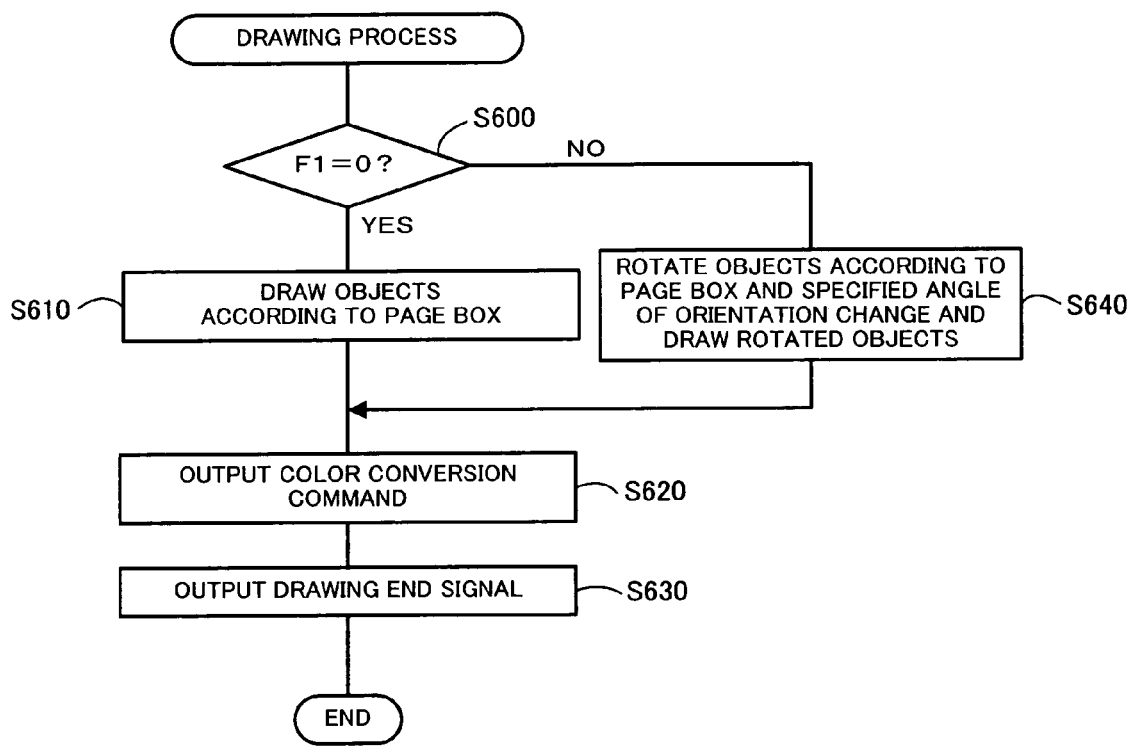
FIG. 15 is a flowchart showing a drawing process.

The RPI 40 receives the drawing start command and executes a drawing process shown in the flowchart of FIG. 15. In the drawing process, the RPI 40 first determines whether the orientation change flag F1 is equal to 0, which represents the absence of the orientation change command (step S600). When the orientation change flag F1 is equal to 0, the RPI 40 draws texts and images according to the generated page box and stores the drawn texts and images as RGB data in the printing image storage area of the memory 50 (step S610). On completion of the drawing, the RPI 40 outputs a color conversion command to the color conversion unit 42 (step S620) and outputs a drawing end signal to the layouter 38 (step S630).

When the orientation change flag F1 is not equal to 0 but is equal to 1, that is, in response to the orientation change command given by the layouter 38, on the other hand, the RPI 40 reads out objects including texts and images according to the generated page box, rotates these objects corresponding to the orientation change specified in generation of the page box, that is, clockwise by 90 degrees, and draws the rotated objects (step S640). FIG. 12(c) shows the object rotated and drawn according to the page box laid out with the orientation change from the landscape orientation to the portrait orientation. This rotation and drawing step enables the object that is laid out in the portrait orientation with conversion of only the coordinates at the preset position of the object to be drawn on the page of the portrait orientation as though the layout of the landscape orientation. Even when the page orientation is different from the paper orientation, the procedure of this embodiment converts the coordinates at the preset position of the object corresponding to the orientation change specified to eliminate the orientation difference and rotates and draws the object according to the orientation change, so as to directly generate drawing data for output. This arrangement desirably saves the memory capacity for storage of drawing data before and after the layout modification and does not require relevant conversion of the drawing data.

Figure 14:
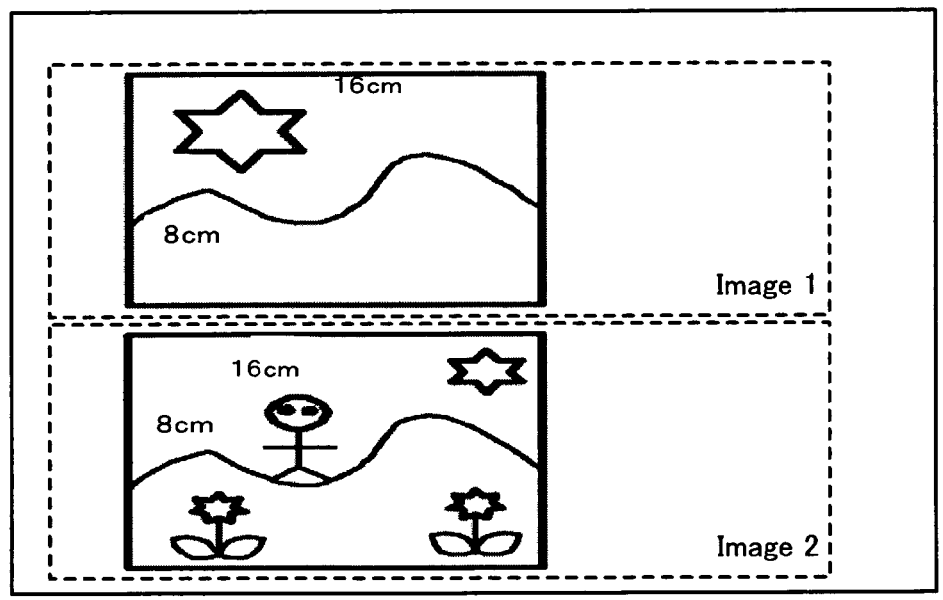
FIG. 14 shows an example of a printing result.

The image drawing procedure reads an image file and draws an image with required processing, such as expansion, in some file formats. FIG. 14 shows a printing result of the example. The broken lines represent virtual areas of div tags included in the body tag, and the dimensions '16 cm' and '8 cm' shown on the top and the left sides of each image represent the image size described in the CSS document. The actual printing result naturally does not include the areas of the div tags and the image size.

After output of the drawing start command, the layouter 38 waits for completion of drawing on the specified page (step S330) and determines whether there is a next page to be processed (step S350). When there is a next page to be processed, the processing flow goes back to step S310 to wait for completion of layout on the next page, specify the next layout page, and output a drawing start command to the RPI 40. When drawing has been completed on all the pages and there is no other page to be processed, the layouter 38 outputs a layout end signal to the analyzer unit 30 (step S360) and terminates the layout drawing instruction process. The output of the layout end signal from the layouter 38 to the analyzer unit 30 enables the analyzer unit 30 to determine whether the layouter 38 is currently making a layout.

As described above, even when the page orientation specified in a given document is different from the paper orientation, the color inkjet printer 20 of the embodiment enables drawing data obtained by drawing a page box laid out and generated according to the specified page orientation to be printed without further orientation change. The procedure of this embodiment prints objects in a specified page orientation on paper of a specified orientation without requiring subsequent orientation change of generated drawing data and consuming the memory capacity for the subsequent orientation change of the drawing data. This arrangement thus desirably saves the memory capacity used for drawing. No requirement of the orientation change of the drawing data ensures prompt processing even when the page orientation is different from the paper orientation.

When the page orientation specified in the given document is different from the paper orientation, the color inkjet printer 20 of the embodiment gives the orientation change command to change the page orientation and thereby eliminate the orientation difference. The layout process and the print execution process are automatically executed in response to the orientation change command.

The printer 20 of the embodiment outputs the orientation change command under the condition of an orientation difference of 90 degrees, for example, as in the case of specification of the portrait orientation and the landscape orientation. The technique of the embodiment readily handles a difference between the orientation of paper and the orientation of any medium. The printer 20 is designed specifically to give the orientation change command when the specified page orientation is landscape and the paper orientation is portrait. The default setting of the paper orientation is typically portrait in general printers. The technique of the embodiment thus readily handles image inputs with specification of landscape as the page orientation from, for example, the digital TV receiver.

The printer 20 of the embodiment carries out the coordinate conversion according to Equations (1) and (2) given above. This arrangement ensures easy coordinate conversion at the preset position of the object in the event of a 90-degree difference between the page orientation and the paper orientation.

The memory 50 and the XML parser 34 included in the color inkjet printer 20 of the embodiment respectively correspond to the data storage module and the structural analysis module of the invention. The layouter 38 is equivalent to the layout setting module and the orientation change command output module of the invention. The RPI 40, the color conversion unit 42, the binarization unit 44, the image buffer 46, and the print execution unit 48 correspond to the print execution module of the invention.

In the color inkjet printer 20 of the embodiment, the layouter 38 outputs the orientation change command in the layout process. The core 32 may alternatively output the orientation change command in the layout process.

The color inkjet printer 20 of the embodiment outputs the orientation change command as the occasion arises. The orientation change may be set as the default in a printing device that has a feed of media specified in portrait orientation but receives inputs of images mainly specified in landscape orientation from a digital TV receiver or another device connected thereto.

In the color inkjet printer 20 of the embodiment, the page orientation is described in a format document specified by a given document. The printing format data including the page orientation may be specified in any other suitable manner on the basis of the description of the given document. For example, the printing format data may be specified directly by the given document or may be specified in advance corresponding to the type of the given document.

In the above description of the color inkjet printer 20 of the embodiment, the specification of the landscape orientation and the portrait orientation is given as an example of the difference between the page orientation and the paper orientation. The technique of the invention is, however, not restricted to the clockwise or counterclockwise orientation change of 90 degrees but is applicable to orientation change of any arbitrary angle according to adequately set conversion equations.

In the color inkjet printer 20 of the embodiment, the preset position as the reference for layout of each object on a page is the left upper corner of the object. Such setting facilitates determination of a drawing start position in the rotation and drawing step. The preset position of the object as the reference for layout is, however, not limited to the upper left corner of the object, but may be any other suitable position of the object.

The color inkjet printer 20 of the embodiment successively converts the coordinates at the preset position (the upper left corner) of the respective objects in the layout process. One modified procedure may read original coordinates of all objects and subsequently carry out coordinate conversion. The coordinate conversion may be executed prior to storage of a page box in the memory or prior to drawing of objects in the drawing process.

When any URL is present in the URL storage buffer area of the memory 50, the color inkjet printer 20 of the embodiment starts analysis of a next XHTML document immediately after completion of analysis of one XHTML document. Analysis of a next XHTML document may start at any desirable timing after completion of analysis of one XHTML document.

The color inkjet printer 20 of the embodiment analyzes and prints XHTML documents described in XHTML language. The technique of the invention is also applicable to analyze and print documents described in another markup language, as well as documents described in any language other than the markup language.

In the configuration of the embodiment, the computer 10, the digital TV receiver 12, and the digital camera 14 are connected to the input interface 22 of the color inkjet printer 20. Any other suitable devices may be connected with the color inkjet printer 20, although connection of the digital TV receiver 12 is preferable.

The above embodiment regards the color inkjet printer as the printing device of the invention that analyzes and prints XHTML documents. The technique of the invention is also applicable to diversity of other printers, for example, color laser printers, monochromatic inkjet printers, and monochromatic laser printers.

The embodiment described above regards the color inkjet printer 20 as the printing device embodying the invention. The technique of the invention is also actualized by a corresponding printing method that executes the series of processing described in the embodiment, as well as by a program used in the printing device and a computer readable storage medium in which the program is stored. Another preferable application is a printing system including the printing device, a digital TV receiver, and a computer.

What is claimed is:

1. A printing device that analyzes a document of describing printable objects in a hierarchical manner in a preset format and prints the objects on a medium, said printing device comprising:

a data storage module that stores data;

a structural analysis module that analyzes a hierarchical tree structure of each object described in a given document and stores the analyzed tree structure into said data storage module;

a layout setting module that, if medium orientation is identical with page orientation, repeats a layout process without orientation change, the layout process without orientation change laying out an element box, to which an object is applied, in a page box corresponding to a specific page and, if there is no area left in the specific page for layout of the element box, laying out the element box in a page box corresponding to a subsequent page, and if medium orientation is different from page orientation, repeats a layout process with orientation change, the layout process with orientation change laying out an element box in a page box corresponding to a specific page and performing coordinate conversion at a preset position of the laid-out element box based on a rotation angle which is determined to eliminate the difference between the page orientation and the medium orientation and, if there is no area left in the specific page for layout of the element box, laying out the element box in a page box corresponding to a subsequent page and performing coordinate conversion at a preset position of the laid-out element box based on the rotation angle; and a print execution module that, in response to a print command after laying out by the layout setting module, if medium orientation is identical with page orientation, reads out data stored in the data storage module according to the page box after layout by the layout setting module and draws the object on the medium, and if medium orientation is different from page orientation, reads out data stored in the data storage module according to the page box after layout by the layout setting module and draws the object on the medium based on a position after the coordinate conversion.

2. A printing device in accordance with claim 1, wherein the coordinate conversion executed by said layout setting module converts coordinates $(X^1n, Y^1n)$ at the preset position of each element box laid out by said layout setting module into coordinates $(X^2n, Y^2n)$ according to Equations (1) and (2) given below, where n represents the number of objects included in a page box and is an integral value of not less than 1:

$$X^2n = \text{Width of Medium in Specified Orientation} - Y^1n \quad (1);$$

and $$Y^2n = X^1n \quad (2).$$

3. A printing device in accordance with claim 1, wherein the preset position of each element box is an upper left corner of the object.

4. A printing method that analyzes a document of describing printable objects in a hierarchical manner in a preset format and prints the objects on a medium, said printing method comprising the steps of:

(a) analyzing a hierarchical tree structure of each object described in a given document;

(b) storing data in a data storage module;

(c) if medium orientation is identical with page orientation, repeating a layout process without orientation change that lays out an element box, to which an object is applied in a page box corresponding to a specific page and, if there is no area left in the specific page for layout of the element box, laying out the element box in a page box corresponding to a subsequent page, (d) if medium orientation is different from page orientation, repeating a layout process with orientation change that lays out an element box in a page box corresponding to a specific page and performing coordinate conversion at a preset position of the laid-out element box based on a rotation angle which is determined to eliminate the difference between the page orientation and the medium orientation and, if there is no area left in the specific page for layout of the element box, laying out the element box in a page box corresponding to a subsequent page and performing coordinate conversion at a preset position of the laid-out element box based on the rotation angle; and (e) after the layout process, if medium orientation is identical with page orientation, reading out data stored in the data storage module according to the page box after layout and drawing the object on the medium;

and if the medium orientation is different from page orientation, reading out data stored in the data storage module according to the page box after layout and drawing the object on the medium based on a position after performing coordinate conversion.

5. A storage medium storing a program that analyzes a document of describing printable objects in a hierarchical manner in a preset format and prints the objects on a medium, said program comprising:

a data storage module that stores data;

a structural analysis module that analyzes a hierarchical tree structure of each object described in a given document;

a layout setting module that, if medium orientation is identical with page orientation, repeats a layout process without orientation change, the layout process without orientation change laying out an element box, to which an object is applied, in a page box corresponding to a specific page and, if there is no area left in the specific page for layout of the element box, laying out the element box in a page box corresponding to a subsequent page, and if medium orientation is different from page orientation, repeats a layout process with orientation change, the layout process with orientation change laying out an element box in a page box corresponding to a specific page and performing coordinate conversion at a preset position of the laid-out element box based on a rotation angle which is determined to eliminate the difference between the page orientation and the medium orientation and, if there is no area left in the specific page for layout of the element box, laying out the element box in a page box corresponding to a subsequent page and performing coordinate conversion at a preset position of the laid-out element box based on the rotation angle; and a print execution module that, in response to a print command after laying out by the layout setting module, if medium orientation is identical with page orientation, reads out data stored in the data storage module according to the page box after layout by the layout setting module and draws the object on the medium, and if medium orientation is different from page orientation, reads out data stored in the data storage module according to the page box after layout by the layout setting module and draws the object on the medium based on a position after the coordinate conversion in the presence of the orientation change command, fetches an object according to the determined layout in each page and draws and prints the fetched object on the medium in response to the orientation change command.

* * * * *